United States Patent
Lou et al.

(10) Patent No.: US 8,181,076 B2
(45) Date of Patent: May 15, 2012

(54) METHOD FOR RETRANSMITTING A DATA SEQUENCE ACCORDING TO CHANNEL CONDITION IN A WIRELESS COMMUNICATIONS NETWORK

(75) Inventors: Hanqing Lou, Plano, TX (US);
Ahmadreza Hedayat, Allen, TX (US);
Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1230 days.

(21) Appl. No.: 11/929,909

(22) Filed: Oct. 30, 2007

(65) Prior Publication Data
US 2008/0181094 A1  Jul. 31, 2008

Related U.S. Application Data

(60) Provisional application No. 60/897,759, filed on Jan. 26, 2007.

(51) Int. Cl.
*G08C 25/02*   (2006.01)
*H04L 1/18*    (2006.01)

(52) U.S. Cl. .......................... 714/748; 370/342; 370/338
(58) Field of Classification Search .................. 714/748; 370/338, 342
See application file for complete search history.

(56) References Cited

U.S. PATENT DOCUMENTS

| | | | |
|---|---|---|---|
| 2003/0128160 A1* | 7/2003 | Sim | 342/382 |
| 2003/0128769 A1* | 7/2003 | Kim et al. | 375/265 |
| 2003/0133408 A1 | 7/2003 | Cheng et al. | |
| 2004/0042385 A1 | 3/2004 | Kim et al. | |
| 2004/0198265 A1 | 10/2004 | Wallace et al. | |
| 2005/0047384 A1* | 3/2005 | Wax et al. | 370/338 |
| 2007/0011589 A1* | 1/2007 | Palanki | 714/780 |
| 2008/0101312 A1* | 5/2008 | Suzuki et al. | 370/342 |
| 2011/0055654 A1* | 3/2011 | Palanki | 714/749 |

OTHER PUBLICATIONS

PCT International Search Report and Written Opinion of the International Searching Authority, Mar. 7, 2008.

* cited by examiner

*Primary Examiner* — Sam Rizk

(57) ABSTRACT

Retransmitting a data sequence over a wireless network according to channel conditions proceeds by transmitting a first transmitting signal representing the data using a first set of beamforming weighting vectors generated according to a first channel condition. A request for re-transmitting the data sequence is received when the first transmitting signal suffers from unrecoverable errors. A re-transmission function is computed according to a second channel condition, and a second transmitting signal is transmitted as generated by using the re-transmission function that is created according to the second channel condition. The data sequence is demodulated and decoded using the first transmitting and the second transmitting signals.

21 Claims, 2 Drawing Sheets

METHOD FOR RETRANSMITTING A DATA SEQUENCE ACCORDING TO CHANNEL CONDITION IN A WIRELESS COMMUNICATIONS NETWORK

CROSS REFERENCE

The present application claims the benefit of U.S. Provisional Application Ser. 60/897,759, which was filed on Jan. 26, 2007.

BACKGROUND

A typical multiple-input-multiple-output (MIMO) network comprises a base transceiver station (BTS) with an antenna array and multiple mobile stations (MSs), at least one of which has multiple antennas. It has been demonstrated that employing a beamforming technique can enhance the performance of an MIMO network. Therefore, the beamforming technique has been adopted by several wireless communications standards, such as IEEE 802.16 d/e (WiMAX)

In an MIMO network employing a beamforming technique, a BTS and an MS rely on beamformed signals to communicate with each other. The signals transmitted from the multiple antennas on the BTS are weighted based on phase and magnitude. The BTS computes beamforming weighting vectors for a receiver of a wireless communications network according to channel condition. Subsequently, the beamforming weighting vectors are applied to the multiple antennas on the BTS to de-correlate transmitting signals on the beamformed channels.

The performance of a wireless communications network is often evaluated based on its capacity and throughput. One of the factors that impact network performance is that the transmitter of a message has the exact information about the channel condition between the transmitter and the receiver. More specifically, whether employing a beamforming technique will result in optimal network performance depends on the accuracy of the channel condition that the transmitter obtains.

Although the combination of beamforming and MIMO techniques further improves network performance, the data transmitted via a wireless channel may still be corrupted due to unexpected impairment of the channel condition. To deal with this issue, a technique of re-transmission, e.g. automatic repeat request (ARQ), is used. The ARQ is a conventional scheme in which a wireless receiver requests re-transmission of a data sequence when unrecoverable frame errors are detected at the receiving end. The most commonly used error detecting code is the cyclic redundancy check (CRC) code.

A data sequence can be protected by an error correcting code, which increases the probability of a successful transmission. An ARQ scheme that combines the ARQ principle with error correcting code is known as a hybrid ARQ (HARQ) scheme. In a conventional HARQ scheme, the re-transmitted data sequence is encoded exactly the same way as the first transmission.

The wireless receiver combines the re-transmitted data sequence with the previously received one and then decodes the combined data sequence. As a result, the re-transmitted data sequence, which is subject to the same channel condition as the original transmission, suffers from the same type of unrecoverable error. The conventional HARQ algorithm only provides limited improvement to the performance of the system.

As such what is desired is method for re-transmitting a data sequence using a different encoding method to avoid unrecoverable errors in a wireless communications network.

SUMMARY

The present invention discloses a method for retransmitting a data sequence according to channel condition in a wireless communications network. The method comprises transmitting a first transmitting signal representing the data sequence using a first set of beamforming weighting vectors generated according to a first channel condition, receiving a request for re-transmitting the data sequence, wherein the first transmitting signal suffers from unrecoverable errors, computing a re-transmission function according to a second channel condition, and transmitting a second transmitting signal generated by using the re-transmission function that is created according to the second channel condition, wherein the data sequence is demodulated and decoded using the first transmitting and the second transmitting signals.

The construction and method of operation of the invention, however, together with additional objects and advantages thereof, will be best understood from the following description of specific embodiments when read in connection with the accompanying drawings.

BRIEF DESCRIPTION OF THE DRAWING

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DESCRIPTION

The following detailed description of the invention refers to the accompanying drawings. The description includes exemplary embodiments, not excluding other embodiments, and changes may be made to the embodiments described without departing from the spirit and scope of the invention. The following detailed description does not limit the invention. Instead, the scope of the invention is defined by the appended claims.

The present invention discloses a method for retransmitting a data sequence using a different encoding method to avoid unrecoverable errors in a wireless communications network. The disclosed method is applicable to an M×N multiple-input-multiple-output (MIMO) network employing a beamforming technique. An exemplary 8×2 MIMO system is presented for purposes of illustrating the present invention.

A data sequence is encoded and modulated into a sequence of Orthogonal Frequency-Division Multiplexing (OFDM) symbols. The sequence of OFDM symbols is further divided into a plurality of transmission units comprising two or more OFDM symbols. Two or more OFDM symbols in a transmission unit are combined according to a predetermined rule to form a transmitting signal transmitted by an antenna array.

Figure 1:
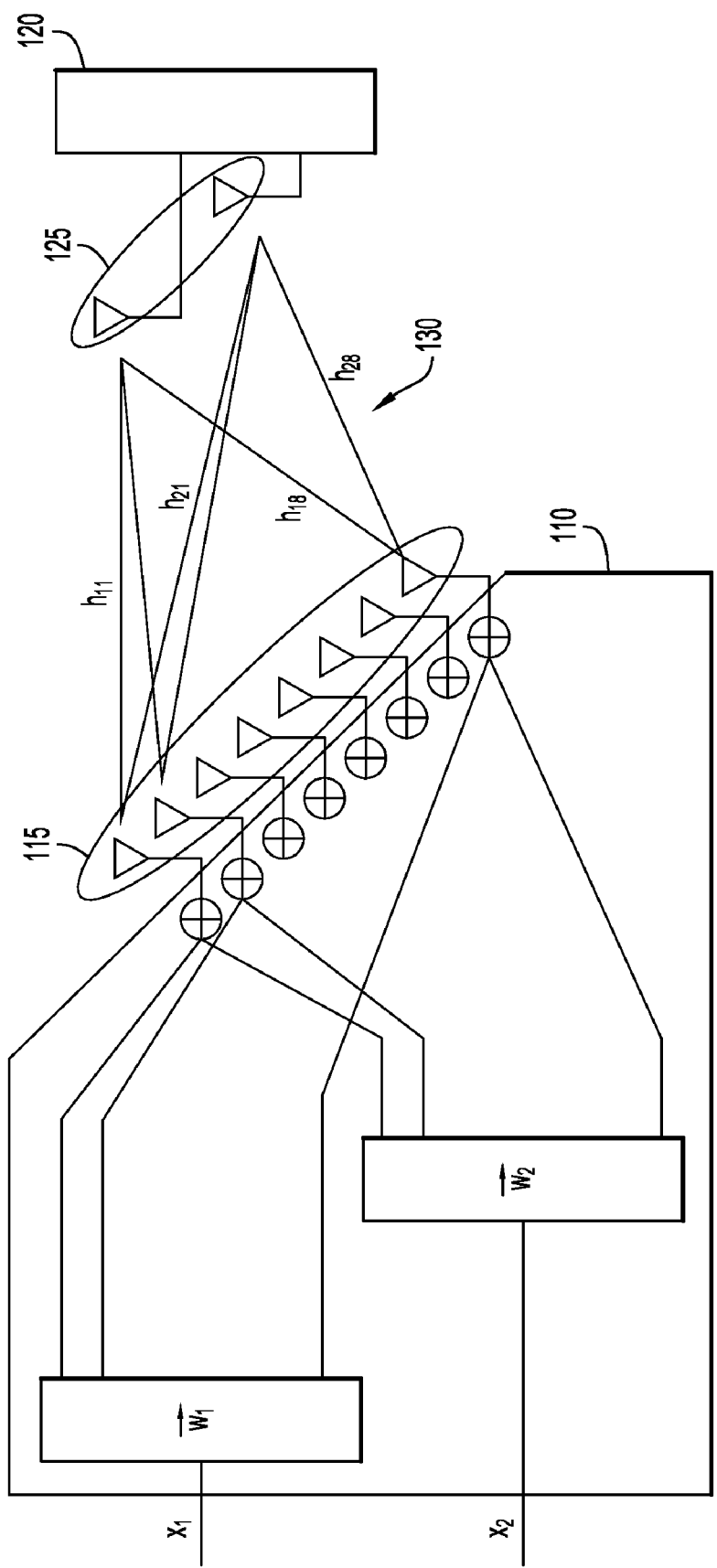
FIG. 1 shows an 8×2 MIMO system comprising a base transceiver station and a mobile station.

FIG. 1 shows an 8×2 MIMO system 100 comprising a base transceiver station (BTS) 110 and a mobile station (MS) 120.

The BTS 110 is equipped with an antenna array 115 of eight antennas while the MS 120 is equipped with an antenna array 125 of two antennas.

The BTS 110 has a set of beamforming weighting vectors $\vec{w}_1$ and $\vec{w}_2$ corresponding to the two antennas of the antenna array 125 on the MS, where $\vec{w}_i=(w_{i1}, w_{i2}, \ldots, w_{i8})^H$; $i=\{1,2\}$; and $(\ldots)^H$ is a Hermitian operator. In one embodiment of the present invention, a transmitting signal $\vec{s}$ 130 is generated by the BTS 110 according to the following equation: $\vec{s}=x_1\vec{w}_1+x_2\vec{w}_2$, where $(x_1, x_2)$ is a transmission unit of OFDM symbols.

Let $\vec{h}_1$ and $\vec{h}_2$ be a set of channel response functions representing the channel condition between the antenna array 115 and antenna array 125, where $\vec{h}_i=(h_{i1}, h_{i2}, \ldots, h_{i8})^H$; $i=\{1,2\}$; $h_{ij}$ is the channel response function between antenna i of the antenna array 125 and antenna j of the antenna array 115; and $(\ldots)^H$ is a Hermitian operator.

The signals received by the antennas of the antenna array 125 are represented by the following equations:

$$r_1 = \vec{h}_1^H\vec{w}_1 x_1 + \vec{h}_1^H\vec{w}_2 x_2 \quad (1) \text{ and}$$

$$r_2 = \vec{h}_2^H\vec{w}_1 x_1 + \vec{h}_2^H\vec{w}_2 x_2 \quad (2),$$

where $r_1$ is the signal received by the first antenna of the antenna array 125 and $r_2$ is the signal received by the second antenna.

The beamforming technique described above effectively creates a virtual channel between the BTS and the MS. The virtual channel is described by the following matrix:

$$\begin{vmatrix} \vec{h}_1\vec{w}_1 & \vec{h}_1\vec{w}_2 \\ \vec{h}_2\vec{w}_1 & \vec{h}_2\vec{w}_2 \end{vmatrix}. \quad (3)$$

In order to obtain optimal performance of the MIMO wireless network, the set of beamforming weighting vectors $\vec{w}_1$ and $\vec{w}_2$ is generated in such a way that the values of $\vec{h}_1^H\vec{w}_2$ and $\vec{h}_2^H\vec{w}_1$ are as small as possible, and the values of $\vec{h}_1^H\vec{w}_1$ and $\vec{h}_2^H\vec{w}_2$ are as large as possible.

The method disclosed in the present invention presents a novel way to re-transmit the data sequence by applying a re-transmission function to a transmission unit to generate a re-transmitting signal $\vec{s}'$. The re-transmission function is generated based on channel condition. The re-transmitting signal is combined with the previous transmitting signal to increase the diversity of the signal received by the wireless receiver, which in turn increases the probability that the signal is successfully demodulated and decoded.

Figure 2:
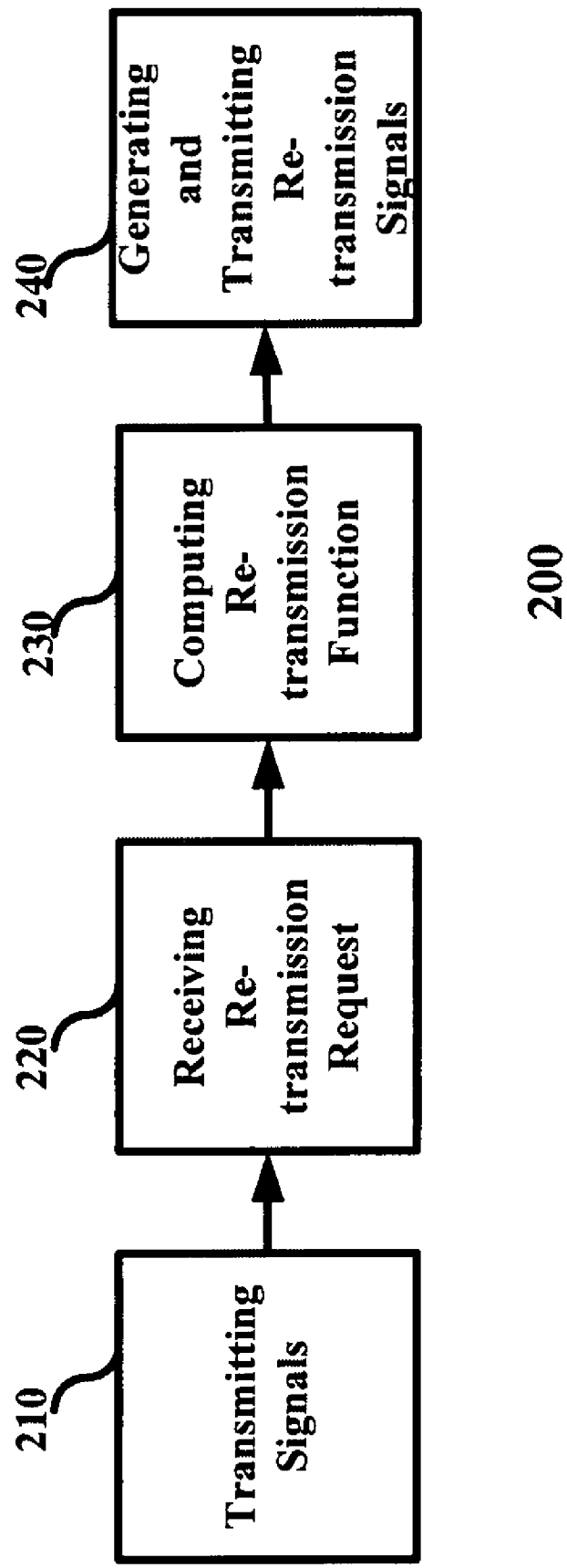
FIG. 2 is a flow diagram illustrating the method disclosed in the present invention.

FIG. 2 is a flow diagram illustrating the method disclosed in the present invention. A transmitting signal is generated from a transmission unit of OFDM symbols according to the method described above, and it is sent from a BTS to an MS (step 210). If the transmitting signal is corrupted, the BTS will receive a negative acknowledgement from the MS regarding unrecoverable errors in the transmitting signal (step 220). In step 230, the BTS computes a re-transmission function according to the current channel condition. Subsequently, the re-transmission function is applied to the transmission unit and thus a re-transmitting signal is generated. In step 240, the re-transmitting signal is generated and sent from the BTS to the MS.

In one embodiment of the present invention, the channel condition between the BTS and the MS is quasi-static. In other words, the channel condition remains the same during the first transmission and the re-transmission of the data sequence. The re-transmission function, defined as $$f\begin{pmatrix} x_1 \\ x_2 \end{pmatrix} = \begin{pmatrix} -x_2^H \\ x_1^H \end{pmatrix},$$

is applied to the transmission unit. Subsequently, a re-transmitting signal $\vec{s}'$, defined as $\vec{s}'=(-x_2^H)\vec{w}_1+(x_1^H)\vec{w}_2$, is generated. The re-transmitting signal is orthogonal to the transmitting signal.

The signals received by the antennas of the antenna array are represented by the following equations:

$$r_1' = \vec{h}_1^H\vec{w}_1(-x_2^H) + \vec{h}_1^H\vec{w}_2(x_1^H) \quad (4) \text{ and}$$

$$r_2' = \vec{h}_2^H\vec{w}_1(-x_2^H) + \vec{h}_2^H\vec{w}_2(x_1^H) \quad (5),$$

where $r_1'$ is the signal received by the first antenna of the antenna array and $r_2'$ is the signal received by the second antenna.

Because the channel condition is quasi-static, the beamforming weighting vector $\vec{w}_i$ for the re-transmitting signal is the same as that for the transmitting signal. This is also true for the channel response function $\vec{h}_i$. Because the transmitting and re-transmitting signals are orthogonal to each other, the disclosed method creates spatial diversity.

A simplified maximum likelihood (ML) demodulation algorithm is used in conjunction with a maximum ratio combining (MRC) algorithm to decode the data sequence using the orthogonal transmitting and re-transmitting signals received by the receiving antennas. Using the two algorithms makes the decoding procedure optimal.

In another embodiment of the present invention, the channel is a fast changing channel. The channel condition at the time of transmitting a signal is completely different from that at the time of re-transmitting the signal. The different channel conditions creating time diversity, and thus the re-transmitting signal need not be orthogonal to the transmitting signal. The re-transmission function for a fast changing channel is defined as $$f\begin{pmatrix} x_1 \\ x_2 \end{pmatrix} = \begin{pmatrix} x_1 \\ x_2 \end{pmatrix}.$$

Because the transmitting and re-transmitting signals received by the receiving antennas are not orthogonal to each other, the simplified ML demodulation algorithm in conjunction with MRC cannot be used to decode the data sequence. Instead, the traditional Chase combining is used.

In yet another embodiment of the present invention, a virtual channel is created between the BTS and the MS so that the optimal decoding procedure for a fast changing channel can be used. The channel condition between the BTS and the MS is slow changing channel. The virtual channel is represented by the following matrix:

$$\begin{vmatrix} \vec{h}'_1\vec{w}'_1 & \vec{h}'_1\vec{w}'_2 \\ \vec{h}'_2\vec{w}'_1 & \vec{h}'_2\vec{w}'_2 \end{vmatrix}. \qquad (6)$$

The virtual channel is created by using a set of re-transmission channel response functions $\vec{h}'_1$, $\vec{h}'_2$ and a set of re-transmission weighting vectors $\vec{w}'_1$, $\vec{w}'_2$. By using a re-transmission function $$f\begin{pmatrix} x_1 \\ x_2 \end{pmatrix} = \begin{pmatrix} -x_2^H \\ x_1^H \end{pmatrix} \text{ to}$$

create orthogonal re-transmitting signals, the signals received by the antennas of the antenna array are represented by the following equations:

$$r'_1 = \vec{h}'^H_1 \vec{w}'_1(-x_2^H) + \vec{h}'^H_1 \vec{w}'_2(x_1^H) \quad (4) \text{ and } r'_2 = \vec{h}'^H_2 \vec{w}'_1(-x_2^H) + \vec{h}'^H_2 \vec{w}'_2(x_1^H) \qquad (5),$$

where $r'_1$ is the signal received by the first antenna of the antenna array and $r'_2$ is the signal received by the second antenna.

The beamforming weighting vectors $\vec{w}'_1$ and $\vec{w}'_2$ are computed in accordance with the requirement that one of the two following conditions must be met. The first condition is $\vec{h}'_1 \vec{w}'_1 = \vec{h}_1 \vec{w}_1$, $\vec{h}'_1 \vec{w}'_2 = \vec{h}_1 \vec{w}_2$, $\vec{h}'_2 \vec{w}'_1 = \vec{h}_2 \vec{w}_1$, and $\vec{h}'_2 \vec{w}'_2 = \vec{h}_2 \vec{w}_2$. The second condition is $\vec{h}'_1 \vec{w}'_1 \approx \vec{h}_1 \vec{w}_1$, $\vec{h}'_1 \vec{w}'_2 \approx \vec{h}_1 \vec{w}_2$, $\vec{h}'_2 \vec{w}'_1 \approx \vec{h}_2 \vec{w}_1$. If the first condition is met, the simplified ML demodulation algorithm can be used in conjunction with MRC to decode the data sequence. Using the two algorithms makes the decoding procedure optimal while maintains time diversity. However, if the second condition is met the performance of the wireless network with the embodiment described above will experience some degree of degradation.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method for retransmitting a vector of data comprising a plurality of symbols according to channel condition dynamics in a multiple-input multiple-output (MIMO) wireless communications network, the method comprising:
    generating beamforming weights that distribute the data vector over a plurality of transmitting antennas for transmission to a plurality of receiving antennas at a receiver;
    transmitting a first signal representing the data vector using the beamforming weights;
    receiving a request for re-transmitting the data vector;
    determining channel conditions between the plurality of transmitting antennas and plurality of receiving antennas as one of quasi-static conditions and rapidly changing conditions;
    selecting a re-transmission function according to the channel conditions;
    generating, through the re-transmission function selected according to the determination that the channel conditions are quasi-static, another data vector that is orthogonal to the data vector and to apply the beamforming weights to the other data vector to form a second signal;
    transmitting the second signal representing the data vector in accordance with the selected re-transmission function; and
    performing a receiver data recovery process at the receiver corresponding to the re-transmission function.

2. The method of claim 1, wherein transmitting of the first signal comprises:
    transmitting Orthogonal Frequency-Division Multiplexing (OFDM) symbols.

3. The method of claim 1, wherein performing the receiver data recovery process includes:
    performing maximum likelihood (ML) demodulation and maximum ratio combining (MRC) with the first signal and the second signal as received at the receiver.

4. The method of claim 1, wherein, upon a positive determination that the channel condition dynamics are rapidly changing, selecting the re-transmission function to either repeat transmission with the data vector or to generate other beamforming weights.

5. The method of claim 4, and further comprising demodulating and decoding received signals from the plurality of receive antennas at the receiver using a Chase combining.

6. The method of claim 4, further comprising:
    selecting the re-transmission function to generate other beamforming weights;
    generating another data vector that is orthogonal to the data vector;
    generating the other beamforming weights to distribute the other data vector over the transmitting antennas; and
    applying the other beamforming weights to the other data vector to form the second signal.

7. The method of claim 6, wherein generating the other beamforming weights includes:
    determining measures of the channel conditions; and
    determining the other beamforming weights such that the product of the beamforming weights and corresponding measures of the channel conditions at the time the second signal is transmitted remains substantially constant with respect to the product of the beamforming weights and the measures of the channel conditions at the time the first signal was transmitted.

8. The method of claim 7, wherein performing the data recovery process includes:
    performing maximum likelihood demodulation and maximum ratio combining with the first signal and the second signal as received at the receiver.

9. The method of claim 1, wherein the number of transmitting antennas is greater than the number of receiving antennas, and wherein transmitting the first signal representing the data vector includes:
    assigning each of the beamforming weights to a corresponding one of the transmitting antennas across the plurality of symbols.

10. The method of claim 1, wherein selecting the re-transmission function is performed upon a positive determination of repeated reception errors at the receiver.

11. A method for retransmitting a vector comprising a plurality of data symbols according to channel conditions in a multiple-input multiple-output (MIMO) wireless communications network, the method comprising:
- generating beamforming weights that distribute the data vector over a plurality of transmitting antennas at a transmitter to a plurality of receiving antennas at a receiver;
- transmitting a first signal representing the data vector using the beamforming weights, wherein the plurality of symbols are Orthogonal Frequency-Division Multiplexing (OFDM)symbols;
- determining that the first signal is unrecoverable at the receiver under quasi-static channel conditions;
- transmitting a second signal representing another data vector that is orthogonal to the data vector; and
- demodulating and decoding the second signal to recover the other data vector at the receiver.

12. The method of claim 11, wherein the demodulating and decoding includes using a maximum likelihood (ML) demodulation in conjunction with maximum ratio combining (MRC).

13. The method of claim 11, wherein the number of transmitting antennas is greater than the number of receiving antennas, and wherein transmitting the first signal representing the data vector includes:
- assigning each of the beamforming weights to a corresponding one of the transmitting antennas across the plurality of symbols.

14. The method of claim 13, wherein transmitting the first signal representing the data vector includes:
- assigning each of the beamforming weights to a corresponding one of the transmitting antennas across the plurality of symbols.

15. A method for retransmitting a vector comprising a plurality of data symbols according to channel conditions in a multiple-input multiple-output (MIMO) wireless communications network, the method comprising:
- generating beamforming weights that distribute the data vector over a plurality of transmitting antennas at a transmitter for transmission to a plurality of receiving antennas at a receiver;
- transmitting a first signal representative of the data vector using the beamforming weights, wherein the plurality of symbols are Orthogonal Frequency-Division Multiplexing (OFDM)symbols ;
- determining that the first signal is unrecoverable at the receiver under rapidly changing channel conditions;
- transmitting a second signal representing the data vector; and
- demodulating and decoding the second signal at the receiver using Chase combining.

16. A method for retransmitting a vector comprising a plurality of data symbols according to channel conditions in a multiple-input multiple output (MIMO) wireless communications network, the method comprising:
- generating beamforming weights that distribute the data vector over a plurality of transmitting antennas at a transmitter for transmission to a plurality of receiving antennas;
- transmitting a first signal representing the data vector using the beamforming weights, wherein the plurality of data symbols are Orthogonal Frequency-Division Multiplexing (OFDM);
- determining that the first signal is unrecoverable at the receiver under rapidly changing channel conditions;
- transmitting a second signal representing another data vector that is orthogonal to the data vector; and
- demodulating and decoding the second signal to recover the data vector at the receiver.

17. The method of claim 16, wherein demodulating and decoding includes maximum likelihood (ML) demodulation in conjunction with maximum ratio combining (MRC).

18. The method of claim 16, further comprising:
- selecting the re-transmission function to generate other beamforming weights;
- generating the other beamforming weights to distribute the other data vector over the transmitting antennas; and
- applying the other beamforming weights to the other data vector to form the second signal.

19. The method of claim 18, wherein generating the other beamforming weights includes:
- determining measures of the channel conditions; and
- determining the other beamforming weights such that a product of the other beamforming weights and corresponding measures of the channel conditions at the time the second signal is transmitted remains substantially constant with respect to a product of the beamforming weights and the measures of the channel conditions at the time the first signal was transmitted.

20. The method of claim 19, and further comprising:
- performing maximum likelihood demodulation and maximum ratio combining with the first signal and the second signal as received at the receiver.

21. The method of claim 16, wherein the number of transmitting antennas is greater than the number of receiving antennas, and wherein transmitting the first signal representing the data vector includes:
- assigning each of the beamforming weights to a corresponding one of the transmitting antennas across the plurality of symbols.

* * * * *